United States Patent Office 3,326,601
Patented June 20, 1967

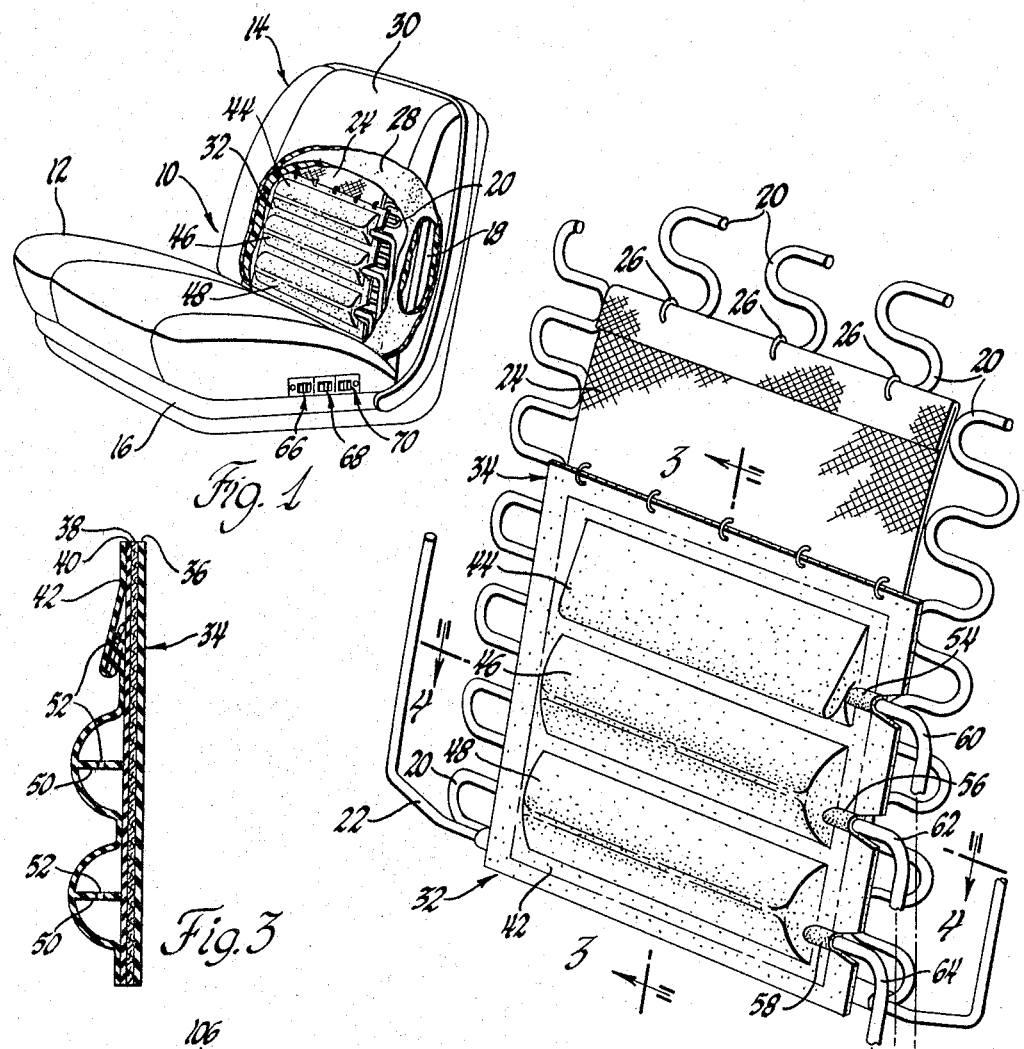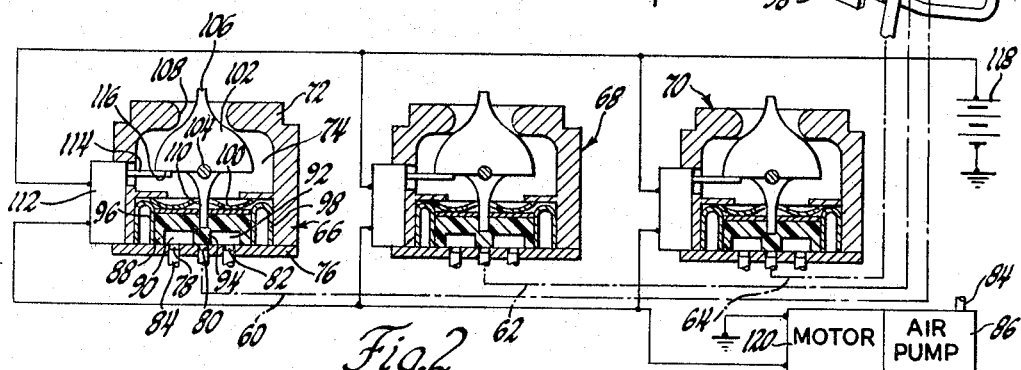

3,326,601
INFLATABLE BACK SUPPORT FOR A SEAT
Suzanne E. Vanderbilt, Royal Oak, Charles F. Parkinson, Troy, and Charles W. Rei, Jr., Warren, Mich., assignors to General Motors Corporation, Detroit, Mich., a corporation of Delaware
Filed July 28, 1965, Ser. No. 475,367
3 Claims. (Cl. 297—284)

This invention relates generally to a spring seat structure for a motor vehicle and more particularly to an inflatable back support to be assembled with the seat back for providing additional support in the lumbar area of the occupant.

This invention relates to seats particularly designed for use in vehicles, but is not restricted to such seats.

Vehicle seats as commonly constructed become uncomfortable whenever the passenger remains in a seated position over extended time periods. This discomfort is especially noticeable in the lower back or lumbar region of the human body.

In the conventional seat structures provision is made for horizontal adjustment of the vehicle seat and in some instances vertical adjustment and tilting adjustment is also provided. Since vehicle seats are designed to accommodate standard contours of the average occupant, the seat back contours, even with the available seat adjusters, do not conform sufficiently to satisfy all occupants' requirements for comfort.

This invention provides an inflatable support having spaced cells of air pockets which may be inflated to provide a support which causes the supporting surface of a seat back to extend outwardly toward the seat occupant from the normal plane thereof and is positioned to contact the lumbar portion of the human body to provide a raised flexible lumbar support in addition to the normal shoulder support as provided in seats of conventional construction.

Accordingly, it is an object of this invention to provide a unit that may be attached to a seat back structure for altering the contour of the seat back in the lumbar area.

Another object of this invention is to provide an inflatable unit that way be placed between the springs and the occupant of a seat for variably changing the contours of the seat back to provide a more comfortable seat.

A further object of this invention is to provide an inflatable unit having a plurality of segments therein which may be inflated singularly or together for changing the contour of the seat back.

Another object of this invention is to provide an inflatable unit having a plurality of segments which may be placed either vertically, horizontally or at any intermediate angle in a seat back, as desired, for altering the contours therein.

A further object of this invention is to provide simple controls for selectively controlling the inflation and deflation of the individual segments or air pockets of the support unit to allow the seat occupant to adjust the seat contour to the position desired.

These and other objects of this invention will be made more apparent from the following description and the accompanying drawings wherein:

FIGURE 1 is an isometric view of a seat structure, with sections cut away, utilizing the present invention with the elongated air pockets extending horizontally.

FIGURE 2 is a view of a portion of the spring structure of a seat back, with portions cut away, showing the manner in which the lumbar support is secured to the seat back and a schematic illustration of valves, pressurized air source and controls for inflating and deflating the lumbar support.

FIGURE 3 is a view taken substantially along line 3—3 of FIGURE 2 illustrating the cross-sectional structure of the lumbar support.

FIGURE 4 is a view taken substantially along line 4—4 of FIGURE 2 for showing the general contour of an air pocket.

Referring now to the drawings, as best seen in FIGURE 1, a seat structure for use in motor vehicles is indicated generally by the numeral 10. The seat structure includes a seat cushion 12 and a seat back cushion 14 mounted on the seat frame 16 and seat back frame 18, respectively, to form the seat structure 10.

As can best be seen in FIGURES 1 and 2, the seat and seat back cushions, 12 and 14, are of conventional construction. Referring specifically to the seat back cushion 14, zig-zag springs 20 are secured to a border wire 22 and to the frame 18 for providing a yieldable base on which an insulator 24 is mounted by conventional hog rings 26. Padding 28 and covering 30 complete the conventional cushion structure.

A lumbar support, indicated generally by the numeral 32, is secured in the seat back cushion 14 in the area of the seat back such that additional support may be provided to the lower back or lumbar region of a seat occupant.

Referring now to FIGURES 2, 3 and 4, the lumbar support 32 includes a flexible, non-expandible sandwich type backing 34 which is preferably constructed of a rubber back portion 36, a fabric inner portion 38, and a rubber facing portion 40. A stretchable rubber sheet 42 is joined to the rubber facing 40 in selected areas for forming three air pockets 44, 46, 48 between the rubber facing 40 and rubber sheet 42. A foldable perforated center rib 50 may be provided in each air pocket to extend longitudinally in the air pocket and have one edge connected to the rubber facing 40 and have the other edge connected to the rubber sheet 42 to provide added rigidity when the air pocket is inflated. Each rib has a plurality of apertures or perforations 52, see FIGURE 4, to assure equalized pressure in the air pocket on opposite sides of the ribs 50, when inflated. As shown in FIGURE 3, with air pocket 44, when the air pockets are deflated, sheet portion 42 and rib 50 fold flat against facing 40.

Referring to FIGURE 2, each of the air pockets 44, 46, 48 has a rigid tube 54, 56, 58, respectively, bonded therein with an air tight seal. From each tube 54, 56, 58 an air line 60, 62, 64, respectively, connects each of the air pockets to its respective control valve 66, 68, 70.

As can be seen in FIGURE 2, the control valves 66, 68, 70 are identical, therefore, for ease of explanation only the details and operation of valve 66 will be explained.

The valve 66 includes a housing 72 with a internal cavity 74 in which is positioned the valve mechanism. A base plate 76 is secured to the housing 72 to enclose the cavity 74. The base plate 76 has three air ports 78, 80 and 82. An air line 84 connects the intake port 78 to a conventional air pump 86. Supply port 80 is connected to air line 60 from air pocket 44 and exhaust port 82 is connected to the atmosphere. A valve member 88 is slidably positioned on the plate 76 within the cavity 74. Two air passages 90 and 92 are formed within valve element 88 and are separated by a land portion 94. By shifting member 88 to the left or to the right from the position shown in FIGURE 2, the supply port connected to air pocket 44 may be connected either to the air pump 86 by means of air line 84 or to the atmosphere through exhaust port 82. When member 88 is in the position shown the land 94 blocks supply port 80 and maintains the air supply in air pocket 44. Three springs 96, 98 and 100 bear against member 88 to maintain it in the neutral or central position shown in FIGURE 2. An actuator 102 is pivotally mounted on pivot pin 104 within cavity 74. The actuator 102 has a handle portion 106 which extends through an aperture 108 in the upper part of a housing 72. A pawl portion 110 of actuator 102 is operably connected to member 88 so that when actuator 102 is pivoted about pivot pin 104 by movement of the handle 106, the pawl 110 will move member 88 in the direction opposite to the direction of movement of the handle. Thus, it can be seen that if the handle 106 is moved to the right, member 88 will be moved to the left, at which position air passage 92 will connect supply port 80 with exhaust port 82 and permit any air under pressure in air pocket 44 to escape to the atmosphere. Conversely, if the handle 106 is moved to the left, member 88 will be moved to the right and air passage 90 will connect intake port 78 to supply port 80.

A microswitch 112 is secured to the housing 72 with a control finger 114 extending within the housing in contact with a shoulder 116 of the actuator 102. The finger 114 controls the microswitch such that when the actuator 102 is moved to the left, the shoulder 116 coacting with the finger 114 completes the circuit in the microswitch 112 closing the circuit from a power source 118 to the motor 120. When the circuit is completed, the motor 120 will drive the air pump 86 and supply air under pressure through air line 84 and inlet port 78. The movement of the actuator 102 to the left will shift the valve member 88 to the right whereby the air passage 90 will connect the inlet port 78 to the supply port 80. Thus, it can be seen that as the air pump is actuated by moving the handle of actuator 102 to the left the air under pressure will pass through air line 84 through inlet port 78, air passage 90, out supply port 80 through air line 60 to inflate the air pocket 44.

The springs 96 and 98 maintain the valve element 88 in the neutral or central position and in so doing, maintain the actuator 102 in its neutral position.

The preferred positioning of the lumbar support 32 with the expandable air pockets extending horizontally, shown in FIGURE 1, may be varied as desired with the air pockets extending vertically or at any angle between the extremes.

Thus, it can be seen that the occupant of a seat equipped with this type of lumbar support may inflate one or more of the air pockets to provide varying additional support where desired in the lumbar area of the seat. With this lumbar support, the contour of the lower seat back may be altered to the most comfortable position desired by the occupant.

While but one embodiment of this invention is shown and described, it is obvious that alterations may be made without departing from the scope of the following claims.

We claim:
1. In a seat structure including a seat adapted to be supported on a platform and a seat back connected to said seat for forming said seat structure, said seat back having a seat back frame consisting of a top, a bottom and a pair of side rails, a plurality of sinuous springs secured to said frame, a loading platform consisting of a portion of said sinuous springs in substantially the same plane, an insulator secured to said platform, an inflatable back support secured on said insulator and to said platform adjacent said bottom rail, said back support including an expandable front portion connected to said back portion, a plurality of air pockets formed between said front and said back portion, each of said air pockets being independent and not communicating with any of the other air pockets and adapted to assume a substantially flat position when deflated, an air tube connected to each of said pockets, a source of air under pressure connected to said air tubes, control means for selectively controlling admission and exhaust of air to each said pockets for inflating and deflating each of said air pockets upon command, seat padding positioned over said back support and said springs, and a seat cover positioned over said padding and secured to said frame for completing said seat back.

2. In combination with a seat back including a seat back frame, a plurality of supporting springs secured to said frame, said springs providing a supporting surface for said seat back, an insulator attached to said springs and covering said supporting surface, padding positioned on said insulator and about said springs for providing the contour of said seat back and a seat back cover for enclosing the seat back structure and presenting a substantially smooth contour for supporting the back and shoulders of an occupant, an auxiliary lumbar support attached to said springs and said insulator and positioned between said insulator and said padding for supporting the lower back of an occupant, said auxiliary lumbar support including a plurality of independent air pockets adapted to assume a substantially flat position when deflated, and control means connected to each air pocket for individually inflating and deflating each of said air pockets upon command, whereby said air pockets may selectively alter the contour of said seat back when one or more of said air pockets are inflated to provide variably increasing support in the lumbar area of the seat occupant.

3. In combination with a seat back structure, an auxiliary back support assembly supported on said seat back structure, said auxiliary back support assembly including a back portion adapted to contact said seat back structure and a front portion adapted to support the lumbar portion of a human body, said back and front portions being joined to each other at spaced intervals to form a plurality of spaced pockets adapted to receive air under pressure, a source of air under pressure, manually controlled means for selectively connecting said pockets to said air source and to exhaust, said manually controlled means includes a source of power, an air pump, a motor operably connected to said air pump for powering said air pump when energized, switch means for connecting said power source to said motor when closed for energizing said motor, a control valve for each of said air pockets, a first air line extending between said air pump and each of said control valves for delivering air under pressure to said valves from said air pump, a supply air line extending from each of said valves to the respective pockets for delivering air under pressure from said valve to said air pocket, each of said valves including a valve member having a plurality of air passages therein, an actuator operably connected to said valve member and to said switch means, spring means biasing said valve and said actuator to a neutral position whereby flow of air under pressure in said air lines is blocked, one of said air passages connecting said air lines upon movement of said actuator in one direction, and connecting said supply air line to the atmosphere upon movement of said actuator in a second direction, said actuator also closing said switch means when moved in said one direction whereby said power source energizes said motor and said motor powers said air pump for supplying air under pressure to the pocket controlled by said control valve.

References Cited

UNITED STATES PATENTS

| | | | |
|---|---|---|---|
| 2,136,510 | 11/1938 | Jensen. | |
| 2,245,909 | 6/1941 | Enfiajian | 5—348 |
| 2,672,183 | 3/1954 | Forsyth | 5—248 |
| 2,838,099 | 6/1958 | Warner | 297—231 |
| 2,938,570 | 5/1960 | Flajole | 5—349 |
| 2,982,341 | 4/1961 | Besser. | |
| 3,110,520 | 11/1963 | Herding | 297—452 |
| 3,128,125 | 4/1964 | Loewy | 297—452 |
| 3,222,698 | 12/1965 | Levenson | 297—452 |

DAVID J. WILLIAMOWSKY, *Primary Examiner.*

G. O. FINCH, *Assistant Examiner.*